United States Patent
Norrie

(10) Patent No.: US 12,175,116 B2
(45) Date of Patent: Dec. 24, 2024

(54) METHOD AND APPARATUS FOR GATHER/SCATTER OPERATIONS IN A VECTOR PROCESSOR

(71) Applicant: Microchip Technology Inc., Chandler, AZ (US)

(72) Inventor: Christopher I. W. Norrie, Castro Valley, CA (US)

(73) Assignee: Microchip Technology Inc., Chandler, AZ (US)

( * ) Notice: Subject to any disclaimer, the term of this patent is extended or adjusted under 35 U.S.C. 154(b) by 59 days.

(21) Appl. No.: 17/669,995

(22) Filed: Feb. 11, 2022

(65) Prior Publication Data

US 2022/0342590 A1    Oct. 27, 2022

Related U.S. Application Data

(60) Provisional application No. 63/180,562, filed on Apr. 27, 2021.

(51) Int. Cl.
*G06F 3/06* (2006.01)

(52) U.S. Cl.
CPC .......... *G06F 3/0655* (2013.01); *G06F 3/0604* (2013.01); *G06F 3/0673* (2013.01)

(58) Field of Classification Search
CPC .... G06F 3/0655; G06F 3/0604; G06F 3/0673; G06F 9/30101; G06F 9/3455; G06F 12/0862; G06F 2212/1024; G06F 2212/6026; G06F 2212/654; G06F 12/0207; G06F 12/0292

See application file for complete search history.

(56) References Cited

U.S. PATENT DOCUMENTS

| | | |
|---|---|---|
| 5,050,067 A | 9/1991 | McLagan et al. |
| 5,590,353 A | 12/1996 | Sakakibara et al. |
| 5,745,721 A * | 4/1998 | Beard ............... G06F 9/3846 |
| | | 712/E9.055 |
| 5,754,876 A | 5/1998 | Tamaki et al. |
| 6,088,783 A | 7/2000 | Morton |
| 6,101,596 A | 8/2000 | Tanaka et al. |

(Continued)

FOREIGN PATENT DOCUMENTS

| | | | |
|---|---|---|---|
| EP | 3336693 A1 * | 6/2018 | ............ G06F 17/16 |
| GB | 2365588 A | 2/2002 | |

(Continued)

OTHER PUBLICATIONS

U.S. Appl. No. 17/669,995, filed Feb. 11, 2022, Christopher I. W. Norrie, Entire Document.

(Continued)

*Primary Examiner* — Zhuo H Li

(74) *Attorney, Agent, or Firm* — Glass & Associates; Alan Heimlich; Kenneth Glass

(57) ABSTRACT

In one implementation a vector processor gather/scatter apparatus comprises a plurality of vector ports, and a random access memory, where the plurality of vector ports are in communication with the random access memory, and where one or more of the plurality of vector ports uses one or more of an address register and one or more of a stride register in communication with the random access memory to allow the gather/scatter of random access memory contents.

4 Claims, 16 Drawing Sheets

(56) References Cited

U.S. PATENT DOCUMENTS

| | | | |
|---|---|---|---|
| 6,138,210 A | 10/2000 | Tremblay et al. | |
| 6,170,054 B1 | 1/2001 | Poplingher | |
| 6,212,630 B1 | 4/2001 | Takayama et al. | |
| 7,058,765 B2 | 6/2006 | Chauvel et al. | |
| 7,340,590 B1 | 3/2008 | Sugumar et al. | |
| 7,356,722 B2 | 4/2008 | Lau et al. | |
| 7,454,554 B1 | 11/2008 | Norrie et al. | |
| 7,634,586 B1 | 12/2009 | Norrie | |
| 7,660,967 B2 | 2/2010 | Hutson | |
| 7,734,977 B2 | 6/2010 | Omes et al. | |
| 7,848,319 B2 | 12/2010 | Omnes et al. | |
| 7,995,696 B1 | 8/2011 | Norrie | |
| 8,069,392 B1 | 11/2011 | Norrie | |
| 8,161,210 B1 | 4/2012 | Norrie | |
| 8,285,884 B1 | 10/2012 | Norrie | |
| 8,327,243 B1 | 12/2012 | Norrie | |
| 8,397,144 B1 | 3/2013 | Norrie et al. | |
| 8,707,122 B1 | 4/2014 | Micheloni et al. | |
| 8,935,598 B1 | 1/2015 | Norrie | |
| 8,984,365 B1 | 3/2015 | Norrie | |
| 8,984,376 B1 | 3/2015 | Norrie | |
| 8,990,661 B1 | 3/2015 | Micheloni et al. | |
| 9,092,353 B1 | 7/2015 | Micheloni et al. | |
| 9,128,858 B1 | 9/2015 | Micheloni et al. | |
| 9,235,488 B2 | 1/2016 | Norrie | |
| 9,397,701 B1 | 7/2016 | Micheloni et al. | |
| 9,448,881 B1 | 9/2016 | Micheloni et al. | |
| 9,450,610 B1 | 9/2016 | Micheloni et al. | |
| 9,590,656 B2 | 3/2017 | Micheloni et al. | |
| 9,813,080 B1 | 11/2017 | Micheloni et al. | |
| 10,230,396 B1 | 3/2019 | Micheloni et al. | |
| 10,915,478 B2 | 2/2021 | Chafin et al. | |
| 2001/0010071 A1 | 7/2001 | Vlot et al. | |
| 2005/0240644 A1* | 10/2005 | Van Berkel | G06F 9/30025 |
| | | | 712/E9.046 |
| 2007/0136565 A1 | 6/2007 | Lambrache et al. | |
| 2008/0071991 A1 | 3/2008 | Shaw et al. | |
| 2008/0222441 A1 | 9/2008 | Olofsson | |
| 2008/0280593 A1 | 11/2008 | Savagaonkar et al. | |
| 2009/0132751 A1* | 5/2009 | Simmons | G06F 13/385 |
| | | | 711/E12.082 |
| 2012/0151156 A1 | 6/2012 | Citron et al. | |
| 2015/0039862 A1 | 2/2015 | Barowski et al. | |
| 2016/0162422 A1 | 6/2016 | Weber | |
| 2017/0024323 A1 | 1/2017 | Havlir et al. | |
| 2017/0097909 A1 | 4/2017 | Simionescu et al. | |
| 2018/0336456 A1 | 11/2018 | Norrie et al. | |
| 2019/0391811 A1* | 12/2019 | Garegrat | G06F 9/3455 |
| 2020/0371960 A1* | 11/2020 | Bhoria | G06F 12/126 |
| 2021/0133106 A1* | 5/2021 | Zbiciak | G06F 9/30047 |
| 2022/0342668 A1 | 10/2022 | Norrie | |
| 2022/0342844 A1 | 10/2022 | Norrie | |
| 2023/0305807 A1* | 9/2023 | Zidan | G06F 17/16 |

FOREIGN PATENT DOCUMENTS

| | | | |
|---|---|---|---|
| WO | 9110194 A1 | 7/1991 | |
| WO | WO-9110194 A * | 7/1991 | G06F 11/3632 |
| WO | WO-2007018553 A1 * | 2/2007 | G06F 17/142 |
| WO | 2010095944 A1 | 8/2010 | |

OTHER PUBLICATIONS

U.S. Appl. No. 63/180,634, filed Apr. 27, 2021, Christopher I. W. Norrie, Entire Document.

U.S. Appl. No. 17/468,574, filed Sep. 7, 2021, Christopher I. W. Norrie, Entire Document.

U.S. Appl. No. 17/701,582, filed Mar. 22, 2022, Christopher I. W. Norrie, Entire Document.

PCT/US2022/017323, Invitation to Pay Additional Fees and, Where Applicable, Protest Fees, European Patent Office, mailed Jun. 8, 2022.

Kauffman, "Function Call Stack Examples", George Mason University, Nov. 22, 2017, 17 pages, Retrieved from the Internet< URL: https://web.archive.org/web/20171122041013/http://cs.gmu.edu/-kauffman/cs222/stack-demo.html.

Wikipedia, "Call stack", Jan. 13, 2021, 8 pages.

Wilson, "6502 Stacks Treatise—Parameter-passing methods", Dec. 28, 2019, 12 pages, Retrieved from the Internet.

PCT/US2022/017323, International Search Report and Written Opinion, European Patent Office, mailed Aug. 4, 2022.

* cited by examiner

400

| 402 memory address: | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 404 memory data: | 1 | 2 | 7 | 4 | 3 | 9 | 1 | 8 | 2 | 7 | 6 | 5 | 3 | 1 | 7 | 4 |

FIG. 4

METHOD AND APPARATUS FOR GATHER/SCATTER OPERATIONS IN A VECTOR PROCESSOR

RELATED APPLICATION

This patent application claims priority of pending U.S. application Ser. No. 63/180,562 filed Apr. 27, 2021 by the same inventor titled "Method and Apparatus for Gather/Scatter operations in a Vector Processor" which is hereby incorporated herein by reference.

FIELD

The present method and apparatus pertain to a vector processor. More particularly, the present method and apparatus relates to a Method and Apparatus for Gather/Scatter operations in a Vector Processor.

BACKGROUND

Traditional gather/scatter operations for general purpose processors are complex, complicated, slow, and this places severe limitations on processors that are built for brute speed such as vector processors because the gather/scatter operations cannot keep up with the speed of vector processors. Vector processors access data at a high rate so non-contiguous data becomes a problem that can result in slowing the rate of vector and matrix processing.

This presents a technical problem for which a technical solution is needed using a technical means.

BRIEF SUMMARY

A vector processor gather/scatter apparatus having a plurality of vector ports and a random access memory (RAM), wherein the plurality of vector ports are in communication with the RAM and wherein one or more of the plurality of vector ports uses one or more of an address register and one or more of a stride register in communication with the RAM.

A method of building a vector processor gather/scatter apparatus having a plurality of vector ports and a RAM, where the plurality of vector ports are in communication with the RAM, and wherein one or more of the plurality of vector ports uses one or more of an address register and one or more of a stride register in communicating with the RAM.

BRIEF DESCRIPTION OF THE DRAWINGS

The techniques disclosed are illustrated by way of examples and not limitations in the figures of the accompanying drawings. Same numbered items are not necessarily alike.

The accompanying Figures illustrate various non-exclusive examples of the techniques disclosed.

FIG. 4 illustrates, generally at 400, a memory arrangement.

DETAILED DESCRIPTION

A Method and Apparatus for Gather/Scatter operations in a Vector Processor is disclosed.

Gather and scatter (gather/scatter) are used to refer to data processing in a computing system where data needs to be gathered from various memory sources prior to processing it and it then needs to be scattered to various destinations in memory after it has been processed.

In the mathematical processing of data in the form of vectors and arrays, an operation such as array multiplication requires data to be fetched in the form of row and column vectors and these row and column vectors are not necessarily contiguous in memory. But a vector processor processes contiguous vectors at a high speed. So, the gather operations need to present a contiguous stream of data to the arithmetic elements where the source of the fetched data may or may not be contiguous. The outputs of the arithmetic elements are each a contiguous stream of data from the arithmetic elements and need to be scattered to locations in memory that may or may not be contiguous.

Figure 1:
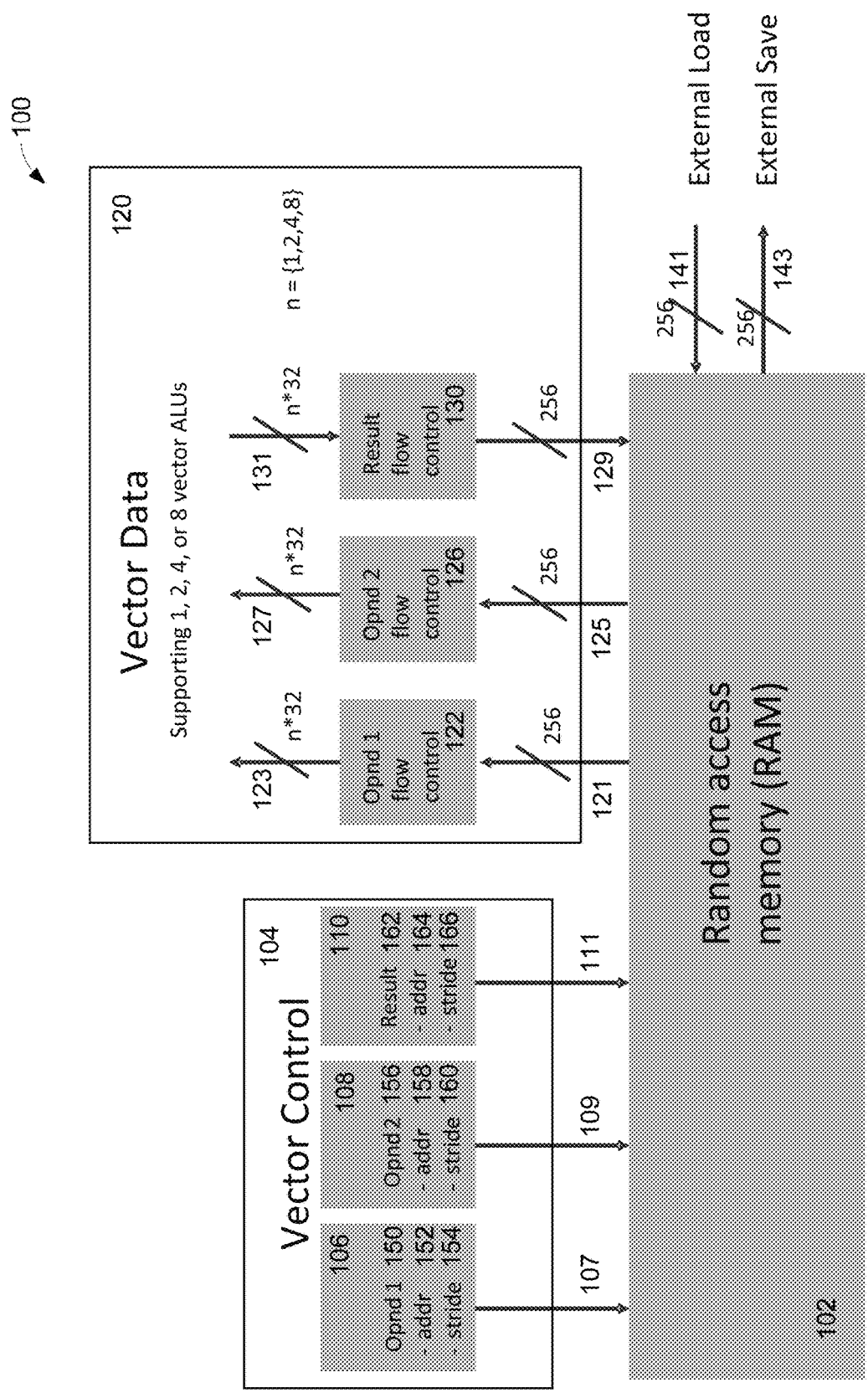
FIG. 1 illustrates, generally at 100, a block diagram overview.

FIG. 1 illustrates, generally at 100, a block diagram overview. Of note the disclosed technique supports n*(2 reads and 1 write) per clock, where n=>1. Also, the technique supports 8 ALU (arithmetic logic unit) operations per clock, every clock, without interruption, through a full vector. Additionally, ALU operations could be a simple ADD or a complex SGMD (Sigmoid function), without limitation.

At 104 is a vector control showing operand1 (Opnd 1) 150 with address register (-addr) 152 and stride register (-stride) 154 at a first port 106 in communication with random access memory (RAM) 102 via interface 107. Vector control 104 is additionally showing operand2 (Opnd 2) 156 with address register (-addr) 158 and stride register (-stride) 160 at a second port 108 in communication with RAM 102 via interface 109. Vector control 104 is additionally showing a result (Result) 162 with address register (-addr) 164 and stride register (-stride) 166 at a third port 110 in communication with RAM 102 via interface 111.

Within ports, for example, port 106 the -addr 152 and -stride are stored in registers. That is, port 106 has an address register (for -addr 152), and a stride register (for -stride 154).

A vector port is the control logic that provides access to the RAM for a single requesting agent, such as Opnd1 150. A vector port includes the logic that performs the address generation using an initial address, stride, and length and the logic that sequences the memory access.

Interface 107 is a link that communicates from the vector port 106 into RAM 102 because it supplies the memory address and read request signals (request signals not shown) to the RAM 102. The memory address supplied is generated (generated address) from an address (-addr) 152, and a stride value (-stride) 154 that increments the generated address, and an optional length (not shown) of the number of memory accesses to be performed which points to a memory location of a vector (i.e. Opnd1 150).

Interface 109 is a link that communicate from the vector port 108 into RAM 102 because it supplies the address (-addr) 158 and stride (-stride) 160 for operand2 (Opnd 2) 156 to the RAM 102 which points to a memory location (e.g. a combination of the address and stride) of a vector (i.e. operand 2 156).

Interface 111 is a link that communicates from the vector port 110 into RAM 102 because it supplies the address (-addr) 164 and stride (-stride) 166 for Result 162 to the RAM 102 where the result of a vector operation is to be stored.

At 120 is vector data showing operand1 (Opnd 1) with flow control 122, interfaced to the RAM 102 via interface 121. Respective output data is shown at 123. Vector data 120 is additionally showing operand2 (Opnd 2) with flow control 126, and interfaced to the RAM 102 via interface 125. As shown at 127 is respective output data. Vector data 120 is additionally showing result (Result) with flow control 130, and interfaced to the RAM 102 via interface 129. Input data is shown at 131.

Shown at 141 is external load to RAM 102. Also shown at 143 is external save from RAM 102.

Figure 8:
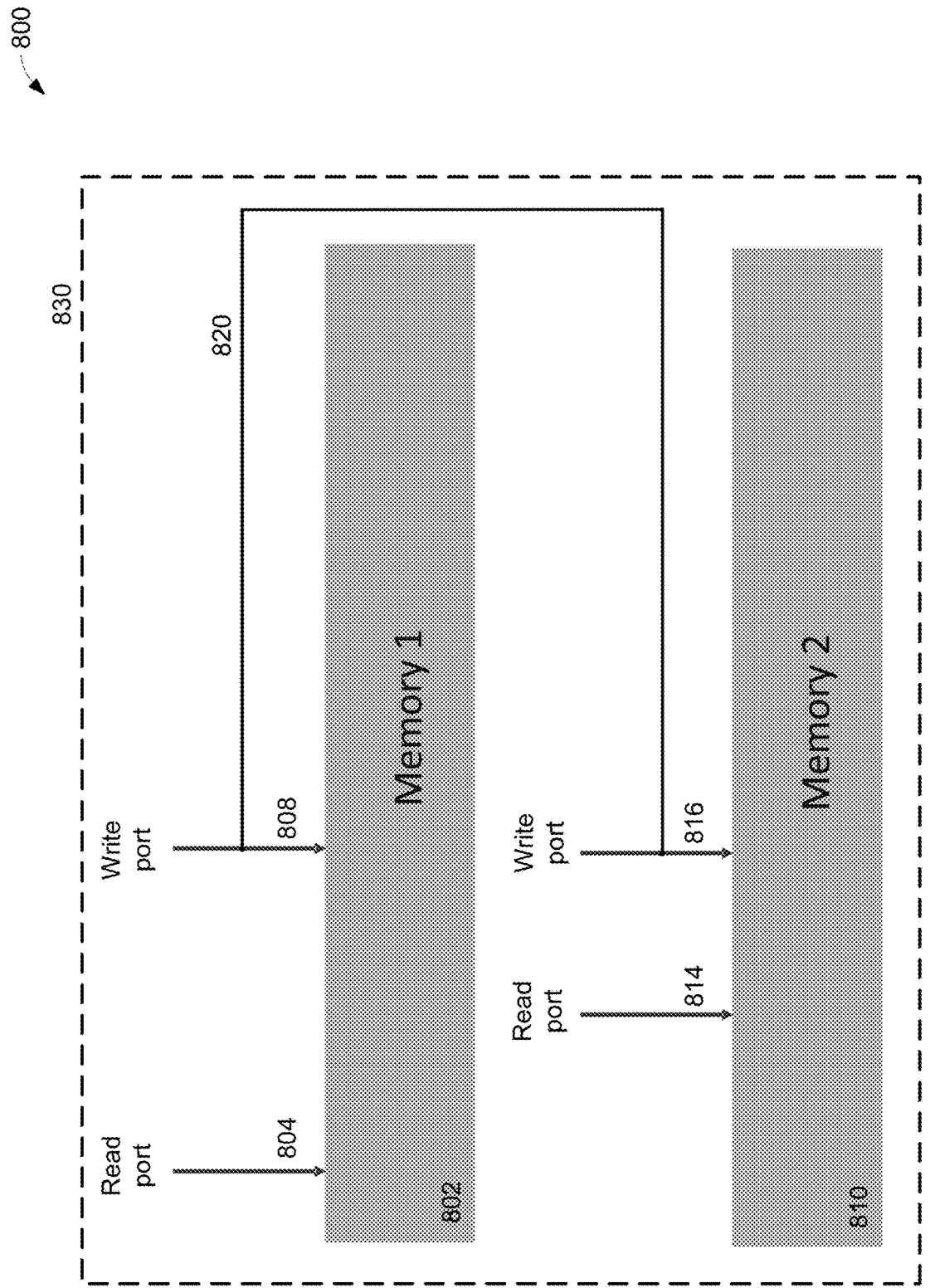
FIG. 8 illustrates, generally at 800, a memory structure that supports 2 read ports and 1 write port.

The technique disclosed in FIG. 1 illustrates vector ports, i.e. interfaces 107, 109, and 111 into a random access memory array, i.e. RAM 102, that uses address registers and stride registers to automatically perform non-contiguous gathering and scattering of vectors of data. These ports can support up to 2 reads and a 1 write per clock cycle while performing the gather and scatter, thereby allowing a maximal vector processing rate. Detailed below in the description and illustrated in FIG. 8 is an example of a memory structure that supports up to 2 reads and 1 write per clock cycle.

The vector ports are further parallelizable to support multiple units of "2 reads and 1 write per clock cycle". Accordingly, this technique can easily support for example, 16 reads and 8 writes per clock cycle for cases that are most common and most important in machine learning algorithms.

For example, when the number of vector ALUs equals 8 (n in block 120 equals 8) then the vector operation can be partitioned among 8 vector arithmetic logic units operating in parallel for an 8-fold increase in processing speed.

The technique as shown in FIG. 1 can parallelize on a single vector operation. That is, rather than having a single vector ALU operation in serial fashion on a vector operation, that vector operation can be performed by more than one vector ALU in a parallel fashion. Additionally, it has the ability to handle non-contiguous vectors in memory without performance degradation.

While FIG. 1 discloses address and stride it is to be understood that in one implementation such values are held in, but not limited to, for example, registers. That is, address and stride can be stored in registers. The implementation is not so limited and in other implementations, the address and stride values may be stored in memory.

While FIG. 1 discloses various bus widths (for example, a 256 bit bus width for each of 121, 125, 129, 141, and 143) the invention is not so limited and bus widths of other sizes may be used.

Figure 2:
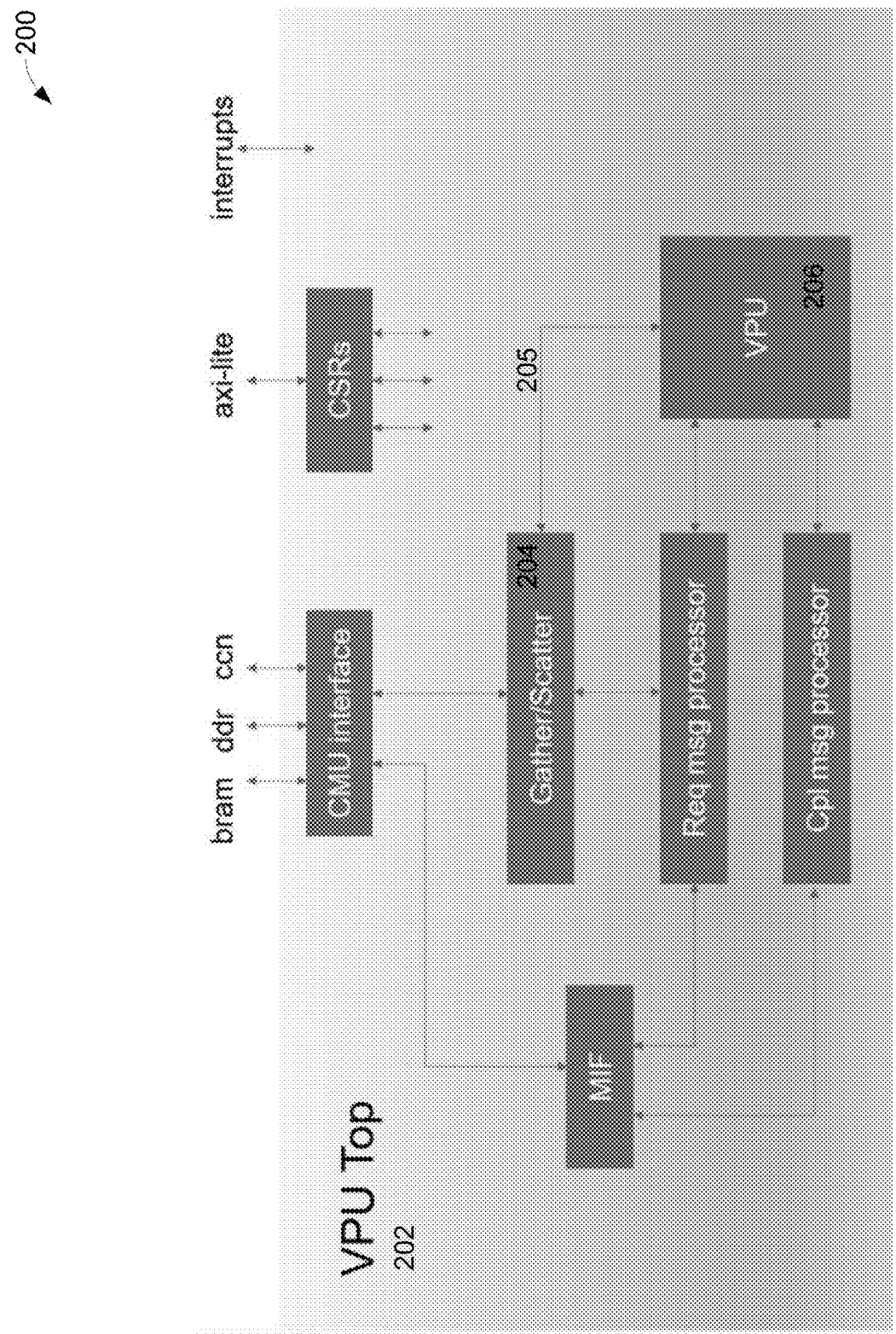
FIG. 2 illustrates, generally at 200, a block diagram overview.

FIG. 2 illustrates, generally at 200, a block diagram overview. At 202 is a VPU Top (vector processing unit) system overview. At 204 is a gather/scatter unit. At 206 is a Vector Processing Unit (VPU) which is in communication with the gather/scatter unit 204 via link 205. Other blocks shown for relation to the gather/scatter unit 204 but not germane to understanding the gather/scatter unit 204 are a CMU (Central Memory Unit) interface with bidirectional communications to bram (buffer RAM), ddr (Double Data Rate RAM), ccn (Coherent Connection Network). The MIF (Memory Interface) communicates with the CMU interface, the Req msg processor (Request message processor) and the Cpl msg processor (completion message processor). The Req msg processor and Cpl msg processor communicate with the VPU 206. Also shown are CSRs (a message based register access interface which communicates with axi-lite (Advance Extensible Interface lite version). Also shown are interrupts that interface to the VPU Top 202.

Figure 3:
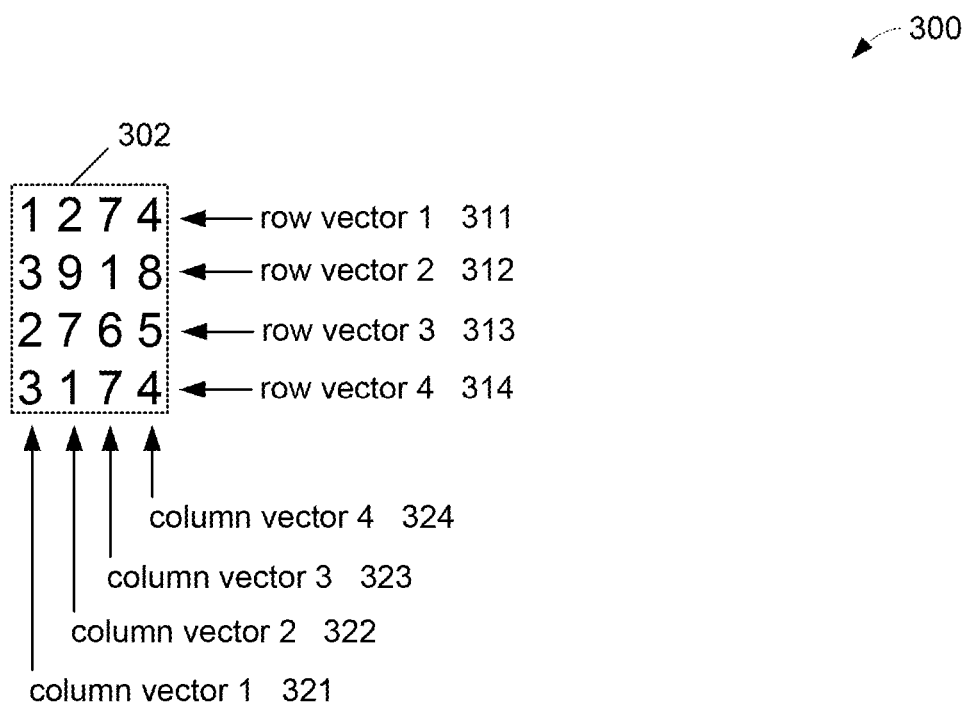
FIG. 3 illustrates, generally at 300, a 4×4 matrix.

FIG. 3 illustrates, generally at 300, a 4×4 matrix with notations. At 302 is a 4×4 matrix having 4 rows and 4 columns. At 311 is row vector 1 having 4 elements having the respective values of 1, 2, 7, and 4. At 312 is row vector 2 having 4 elements having the respective values of 3, 9, 1, and 8. At 313 is row vector 3 having 4 elements having the respective values of 2, 7, 6, and 5. At 314 is row vector 4 having 4 elements having the respective values of 3, 1, 7, and 4. At 321 is column vector 1 having 4 elements having the respective values of 1, 3, 2, and 3. At 322 is column vector 2 having 4 elements having the respective values of 2, 9, 7, and 1. At 323 is column vector 3 having 4 elements having the respective values of 7, 1, 6, and 7. At 324 is column vector 4 having 4 elements having the respective values of 4, 8, 5, and 4.

FIG. 4 illustrates, generally at 400, the 4×4 matrix as shown in FIG. 3 arranged in memory so that each row of the 4×4 matrix has consecutive memory addresses and each row follows the row behind it, i.e. the rows of the 4×4 matrix are arranged in consecutive order in memory. At 402 is the memory address that ranges as shown from 0 to 15 (16 memory locations). And at 404 is shown the memory data for each of the corresponding memory addresses. For example, in this arrangement memory addresses 0, 1, 2, and 3 hold respectively memory data 1, 2, 7, and 4 which represent row vector 1 311 in FIG. 3. Memory addresses 4, 5, 6, and 7 hold respectively memory data 3, 9, 1, and 8 which represent row vector 2 312 in FIG. 3. Memory addresses 8, 9, 10, and 11 hold respectively memory data 2, 7, 6, and 5 which represent row vector 3 313 in FIG. 3. Row vector 4 314 of FIG. 3 is held in memory address locations 12, 13, 14, and 15 which hold respectively values 3, 1, 7, and 4.

As can be seen from FIG. 4, vectors of data are not necessarily organized to occupy sequential locations in memory. This is especially true if the data is a matrix. If row vectors of the matrix occupy sequential memory locations then column vectors cannot occupy sequential memory locations.

Therefore, during a matrix multiplication, for example, when row vector 1 311 is multiplied by column vector 1 321 (see FIG. 3), the addresses of the row vector 1 are 0, 1, 2, and 3, and the addresses of the column vector 1 are 0, 4, 8, 12 (see FIG. 4). This multiplication of the first row vector and the first column vector can be described as multiplying two length 4 vectors where:

vector 1 starts at address 0 and increments the address by a stride of 1 for each vector element; and vector 2 starts at address 0 and increments the address by a stride of 4 for each vector element.

The length is common between the two vectors but their starting addresses and strides are independent values.

Among the techniques disclosed herein, one can specify the multiplication of these two vectors with a single vector-multiply instruction. This is significantly different than the general means of programming. For example, in pseudo code, a vector multiplication (dot product) may be expressed as:

```
addr1   = 0;         // address of 1st vector
addr2   = 0;         // address of 2nd vector
addr3   = 16;        // address where result of vector multiplication
                     is to be stored
stride1 = 1;         //stride to use for accessing memory for 1st vector
stride2 = 4;         //stride to use for accessing memory for 2nd vector
stride3 = 1;         //stride to use for accessing memory for storing
                     vector multiplication
result
mem[addr3] = 0;      //store in memory addr3 the value of 0
for (i=0; i<length; i++) {       //for loop operation
    mem[addr3] = mem[addr3] + (mem[addr1] * mem[addr2]);
    addr1 += stride1;
    addr2 += stride2;
}
addr3 += stride3;
```

Note that the above addr3=16 is where the result of vector multiplication is to be stored and in FIG. 4 would immediately follow memory address 15. However, it should be noted that addr3 may be assigned a different address and accordingly the vector multiplication result would be stored at the different address.

If this operation were performed on a general purpose processor, the loop becomes many instructions that perform the multiplication and address increments. However, with the techniques disclosed the loop can be reduced to a single instruction. This single instruction is supported by specialized memory ports and instructions that control the memory ports by specifying the parameters of the vectors. For example, the single instruction would initialize the running sum to 0 then for every pair of operands from the two operand read ports it would add to the running sum the product of the two operands. After the final pair of operands have been processed, the running sum is the dot product of the two operand vectors and is written to the result write port.

In one implementation, each of 3 ports require an address and stride. Two of the ports perform memory reads and one port performs memory writes. Furthermore, the two read ports also require a length, which is a common value between the two ports.

The write port does not necessarily need a length. This is because while the operand vectors may have the same length the result vector may have a different length. For example, the dot-product of two vectors generates only a single result no matter what length the operand vectors have. So, in one implementation it may be more convenient for the write port to simply receive a "write" signal from the arithmetic logic units (ALUs) that generates the result and, for every assertion of this signal, the write address is incremented by the write stride.

Figure 5:
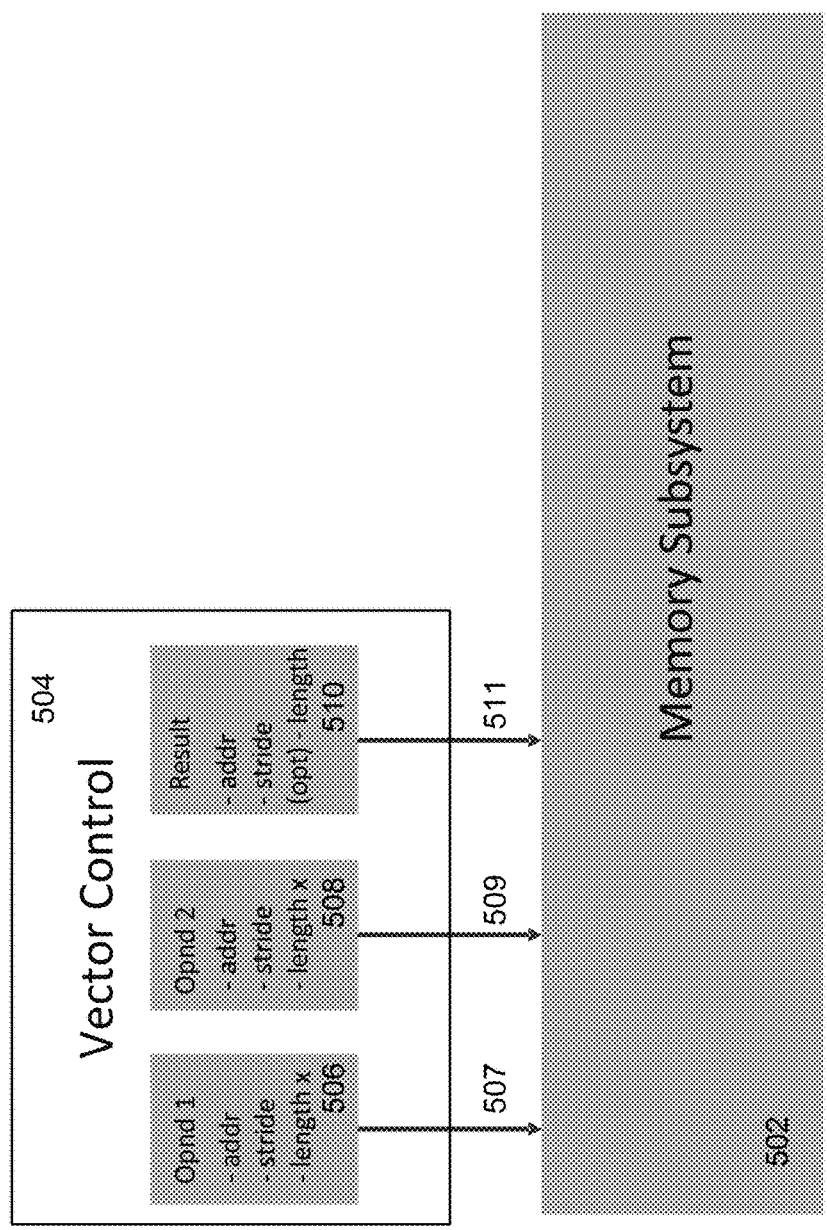
FIG. 5 illustrates, generally at 500, a block diagram of 3 ports.

FIG. 5 illustrates, generally at 500, a block diagram of 3 ports interacting with a memory subsystem 502. At 504 is a vector control showing at 506 a first port including operand1 (Opnd 1) with address (-addr), stride (-stride), and length (-length x) and in communication with memory subsystem 502 via interface 507. Vector control 504 is additionally showing at 508 a second port including operand2 (Opnd 2) with address (-addr), stride (-stride), and length (-length x) and in communication with memory subsystem 502 via interface 509. Note that length x at 506 and length x at 508 are the same length. Vector control 504 is additionally showing a third port 510 including result (Result) with address (-addr) and stride (-stride), with an optional length and in communication with memory subsystem 502 via interface 511. The optional length at 510 need not be the same length as length x at 506 or 508. The ports 506, 508, and 510 communicate via interfaces 507, 509, and 511 respectively, each to memory subsystem 502 a sequence of addresses and read/write controls. The length of the sequence is determined by the length register and the addresses are determined by the addr and stride registers.

The length (-length x) at 506 and 508, and optionally (opt)-length at 510 are used to indicate the number of memory accesses that should occur, for example, to fetch an operand (e.g. Opnd 1, Opnd 2) or write a result (e.g. Result). For example, every cycle can fetch a set of operands. The length indicates the number of cycles a set of operands is fetched. So, if a vector consists of 10 elements, a length of 10 indicates the port is to fetch one element for 10 consecutive cycles. Similarly for the store (Result) length, if that option is used. Alternatively, the ALU indicates when a store is to be performed.) So, in essence, the length parameter can be considered a stop signal for the vector control (e.g. 504).

As illustrated in FIG. 5 via interface 507 and interface 509 are communicated a sequence of addresses and read/write controls. The length of the sequence is determined by the length register and the addresses are determined by the addr and stride registers to the memory subsystem 502 where operands Opnd 1 and Opnd 2 may be read. The address, stride and length registers and all the associated logic for generating the addresses and read/write controls to the memory subsystem are considered a read port. As illustrated in FIG. 5 interface 511 communicates a sequence of addresses and read/write controls. The length of the sequence is determined by the length register and the addresses are determined by the addr and stride registers into the memory subsystem 502 where the result is to be stored, so this is considered a write port. Alternatively to using the optional length parameter the vector ALU knows if it generated a result so it can indicate the write needs to be performed.

In one implementation the address, stride, and length of the operands, such as illustrated in FIG. 5 are set by the following instructions:

SLEN—Set the LENgth of the operand vectors in both read ports simultaneously
SAS1—Set the Address and Stride of vector operand 1
SAS2—Set the Address and Stride of vector operand 2
SAS0—Set the Address and Stride of vector result Depending on the character of the instruction set for a particular implementation, the SAS instructions may be split into separate instructions for setting the address and setting the stride. What is of note is that one instruction can set the common length for both read ports and each port has their own address and stride values that can be set from an instruction or instructions.

Once the ports (read and write) have been set up, the entire multiplication operation is sequenced from a single MUL instruction (multiply). The MUL instruction will inform the read ports to start their sequence of fetches, inform the ALU to perform the actual multiplication, and the write ports will perform writes for every result it receives from the arithmetic logic unit.

In one implementation the MUL instruction pipelines the operation. For example, the execution of a MUL instruction (element-by-element multiply) will result in the following sequence for a length 6 vector operation:

| cycle | 1 | 2 | 3 | 4 | 5 | 6 | 7 | 8 | 9 | 10 |
|---|---|---|---|---|---|---|---|---|---|---|
| rd port 0 | r0 | r1 | r2 | r3 | r4 | r5 | | | | |
| rd port 1 | r0 | r1 | r2 | r3 | r4 | r5 | | | | |
| ALU mul | | | m0 | m1 | m2 | m3 | m4 | m5 | | |
| wr port | | | | w0 | w1 | w2 | w3 | w4 | w5 | |

This timing is a non-limiting example. Here, it demonstrates 2 cycles between a memory read starting, r0, and the result, for storage, being available from the first multiplication, m0. The memory read and arithmetic multiplication may require more or less cycles.

In one implementation, when given the start signal, each read port initiates a memory read with the port's address register and increments the address register by the port's stride register. This process is repeated according to a value in the length register. That is, the number of times to do a memory read with the port's address register and increment the address register by the port's stride register can be controlled by the value in a length register. For every result an ALU produces, it generates an accompanying write signal that indicates to the write port to initiate a memory write with its address register and increments it by its stride register. The write port, optionally may have no knowledge ("no knowledge mode of operation") of how many writes will be required by the instruction. So, for every write signal it initiates a memory write with its address register and increments it by its stride register. The length register does not need to be considered in this no knowledge mode of operation for write operation.

In one implementation the port address registers are returned to their starting values after a final operation, i.e. after the length value in the length register has been achieved. For the write port, in some examples, a signal to indicate the final write may be needed because the write port may be in a no knowledge mode of operation. The reason for the port address registers to be returned to their starting values after a final operation is that it restores the port address registers to reference the addresses for the start of the vectors because often times the same vector is used in a subsequent operation. This avoids having to execute many SAS instructions to set up the same vector. It can lead to faster execution plus smaller and more readable code.

For example, in the following code an operand 1 has an offset, found in address 200, added to operand 1, and the result is scaled by some factor found at address 300. The original operand 1 is replaced with the final result. Notice that multiple vector instructions are executed but the result port and operand 1 port are only set up once:

| | |
|---|---|
| SLEN 64 | // vector length is 64 |
| SAS0 100,1 | // result written to 100,101,...,163 |
| SAS1 100,1 | // op1 read from 100,101,...,163 |
| SAS2 200,1 | // op2 read from 200,201,...,263 |
| ADD | // result <- op1 + op2   op1 has offset added |
| SAS2 300,1 | // op2 is read from 300, 301,...,363; re-use the same result and op1 |
| port states | |
| MUL | // result <- op1 * op2   op1 is scaled with a multiplicative factor |

Figure 6:
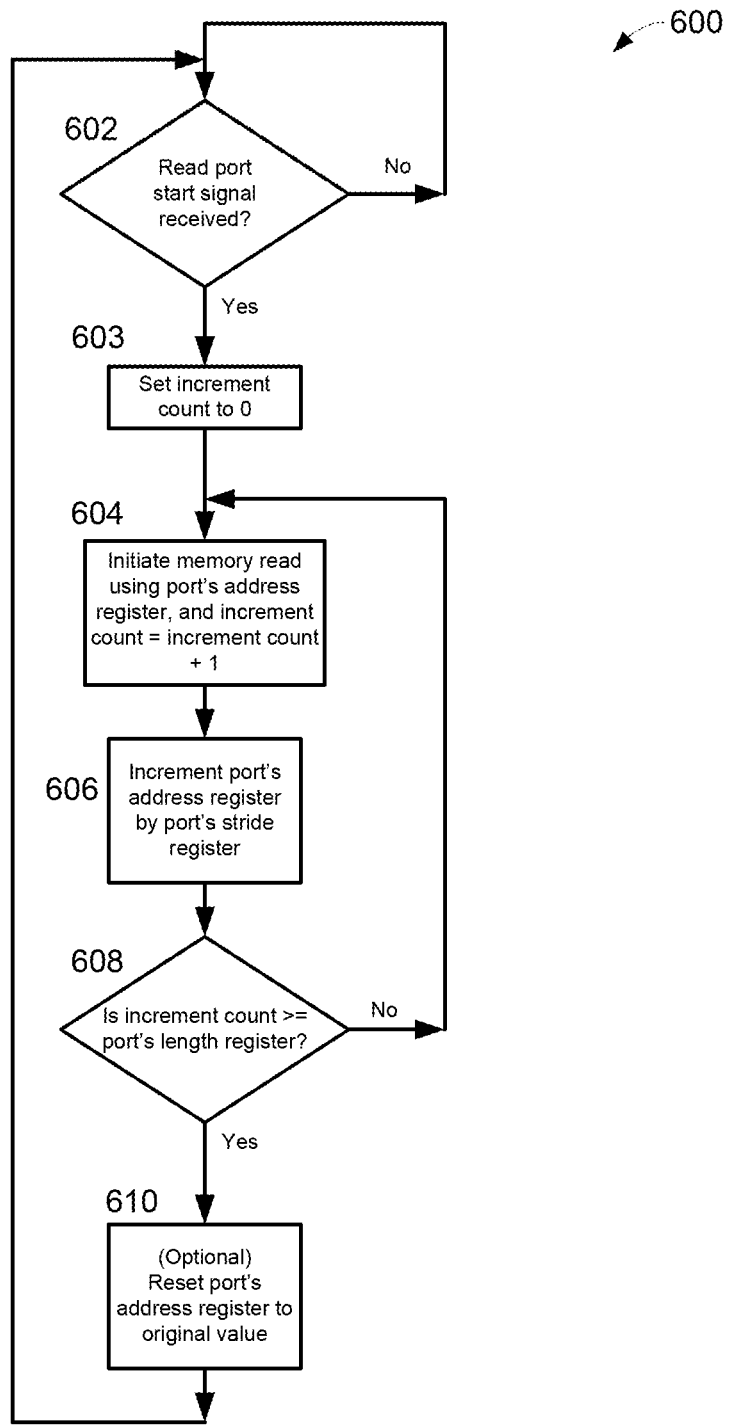
FIG. 6 illustrates, generally at 600, a flow chart for one implementation of a read port operation.

FIG. 6 illustrates, generally at 600, a flow chart for one implementation of a read port operation. Before entering this read port operation and not shown in FIG. 6, the read port's address register is set to a value we will call an original value. Then at 602 a check is made to see if a read port start signal was received? If not (No) then another check at 602 is made. When a read port start signal is received (Yes) then proceed to 603 and set the increment count to zero, then proceed to 604 and initiate a memory read using the port's address register and the increment count is increased by 1. The increment count is a counter that keeps track of the number of times that the 604 operation of Initiate memory read using the port's address register has occurred. Then proceed to 606 where the port's address register is incremented by the port's stride register. Proceeding to 608 a check is made to see if the increment count>=port's length register? If it is no (No) then return to 604. If the port's address register is greater than or equal to the port's length register (Yes) then proceed to optional 610. Optional 610 resets the port's address register to the original value and then returns to 602.

While in FIG. 6 at 608 a check is made to see if the increment count>=port's length register, the implementation is not so limited and a check could be made to see if the increment count <port's length register, in which case the logic decision at 608 may need to be different. The reason an increment count comparison to the length register is used instead of an address comparison in this example is because each read port may have a different stride value.

Figure 7:
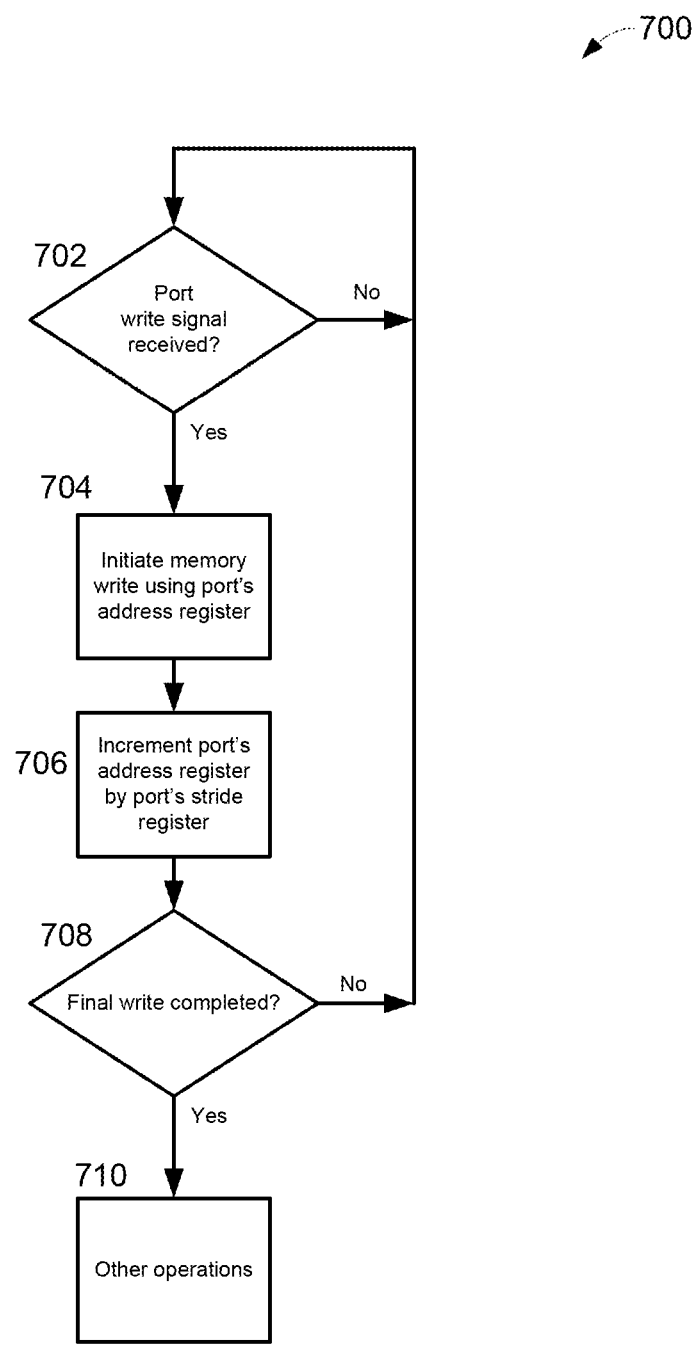
FIG. 7 illustrates, generally at 700, a flow chart for one implementation of a port write operation.

FIG. 7 illustrates, generally at 700, a flow chart for one implementation of a port write operation. At 702 a check is made to see if a port write signal was received? If not (No) then continue checking at 702. If a port write signal is received (Yes) then proceed to 704 and initiate a memory write using the port's address register. Then proceed to 706 and increment the port's address register by the port's stride register. Then proceed to 708 and determine if the final write completed and if not (No) then proceed to 702. If the final write has been completed (Yes) then proceed to 710 where other operations are performed.

Determination of final write completed at 708, in one implementation, is determined from a signal from a component in a vector processing unit.

In one implementation, for example as illustrated in FIG. 1 at 102 there is only one memory and yet it should support 2 read operations and 1 write operation simultaneously and maintain this, cycle after cycle. This allows a single arithmetic logic unit to maintain a processing rate of one operation (e.g., add or multiply) per clock. This was illustrated above at the length 6 vector operation example.

FIG. 8 illustrates, generally at 800, a memory structure 830 that supports 2 read ports and 1 write port. In this implementation there are two copies of each memory location, i.e. a first copy at Memory 1 at 802 and a second copy at Memory 2 at 810. Each of Memory 1 at 802 and Memory 2 at 810 has a read port and write port as shown respectively at 804 and 808 for Memory 1 802, and at 814 and 816 for Memory 2 810. This provides a total of 2 read ports and 2 write ports. In this implementation, the writes ports 808 and 816 are tied together via 820 so that writes are simultaneously performed on both of the memories 802 and 810, thereby keeping the memories 802 and 810 identical in write content. Keeping the memories 802 and 810 identical in write content becomes more expensive (size wise) as the memory becomes larger.

In one implementation memory structure 830 can be considered a bank of memory for which the bank has 2 read ports and 1 write port, which allows for simultaneous reads from each of the read ports and writing to the write port.

Memory structure 830 in one implementation is capable of a 2 memory reads and 1 memory write based on a single clock cycle. That is during a single clock cycle Memory 1 802 can read a memory location as addressed by Read port 804 and can write a memory location as addressed by Write port 808, likewise during this same single clock cycle Memory 2 810 can read a memory location as addressed by Read port 814 and can write a memory location as addressed by Write port 816. Since Write port 808 and Write port 816 are tied together via 820 only a single write occurs during a single clock cycle. Thus the Memory structure 830 in one implementation is capable of 2 reads and 1 write based on a single clock cycle.

In another implementation the memory is partitioned, with respective read and write controls for each of the partitions, and a constraint is added that requires reads and writes to occur on different partitions. This avoids having duplicate copies of the memory but now imposes a programming requirement to ensure the constraint is not violated.

Figure 9:
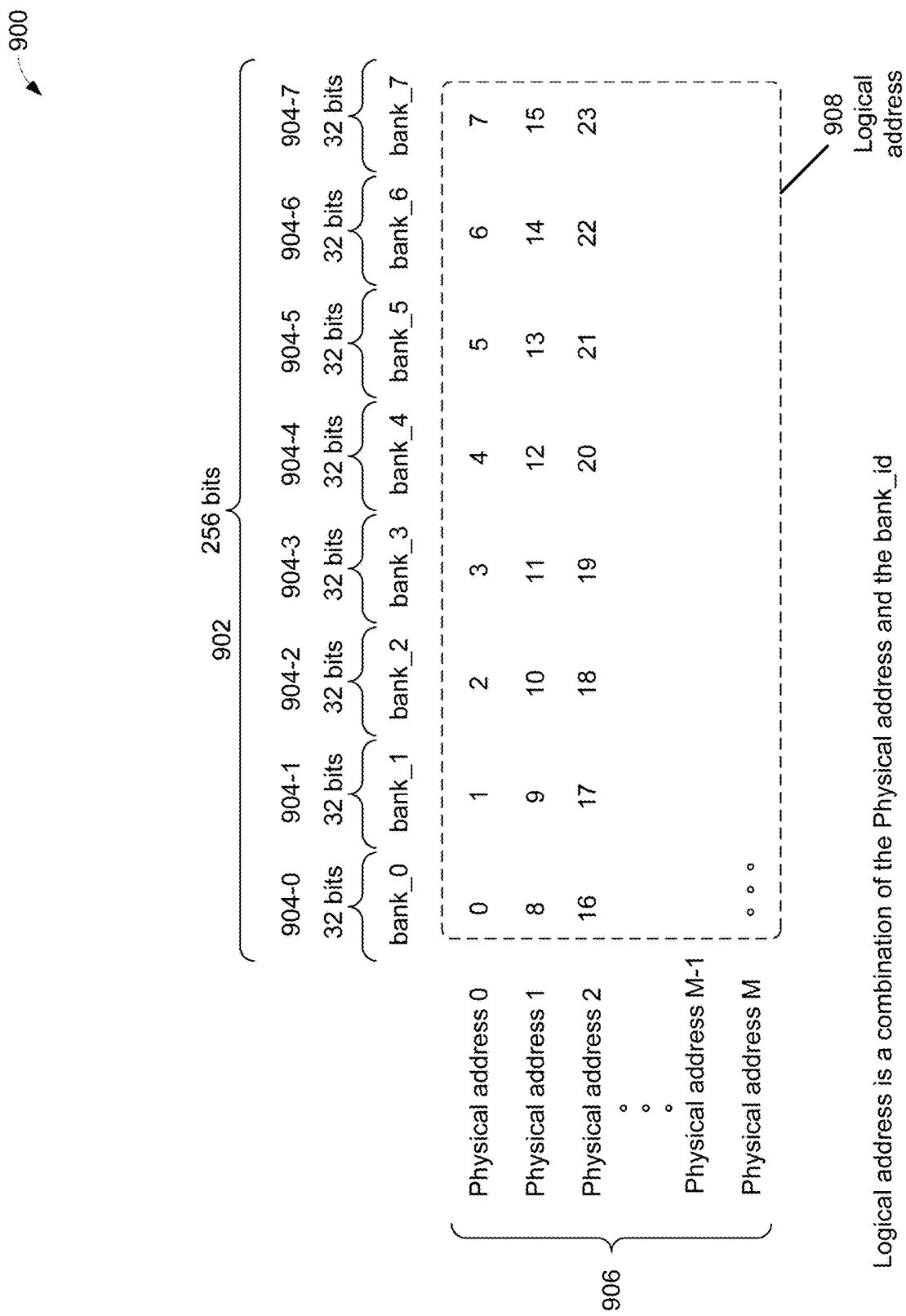
FIG. 9 illustrates, generally at 900, a memory where is added a specific structure to the memory.

FIG. 9 illustrates, generally at 900, a memory (for example, a RAM) where is added a specific structure to the memory—that of logical addresses 908. In one particular implementation, for example, the memory is 256 bits wide 902 and every 32-bits is part of a different bank 904-0 to 904-7, making the memory 8 banks wide. Each bank has its own set of RAM read and write controls. The diagram shows how the logical address 908 is distributed into the physical addresses of the 8 banks. For example, logical address 12 is located at physical address 1 in bank_4.

In an implementation, for example, as shown in FIG. 9, with this RAM banking it is possible to have the RAM loaded by an external process at the rate of 256-bits per clock (for example, as illustrated in FIG. 1). However, the vector ALU may operate on 32-bit floating point operands. Since each RAM bank has their own RAM read and write ports (for example as shown in FIG. 8 at memory structure 830), this allows the write port to write a 32-bit result to a physical RAM address without the write port having to do a read-modify-write (RMW) operation. RAM loaded by an external process at the rate of 256-bits per clock is illustrated at FIG. 1 where at 141 is an external load of 256 bits.

In one implementation the read and write ports include components that convert the logical address into a specific RAM bank and RAM physical address.

Figure 10:
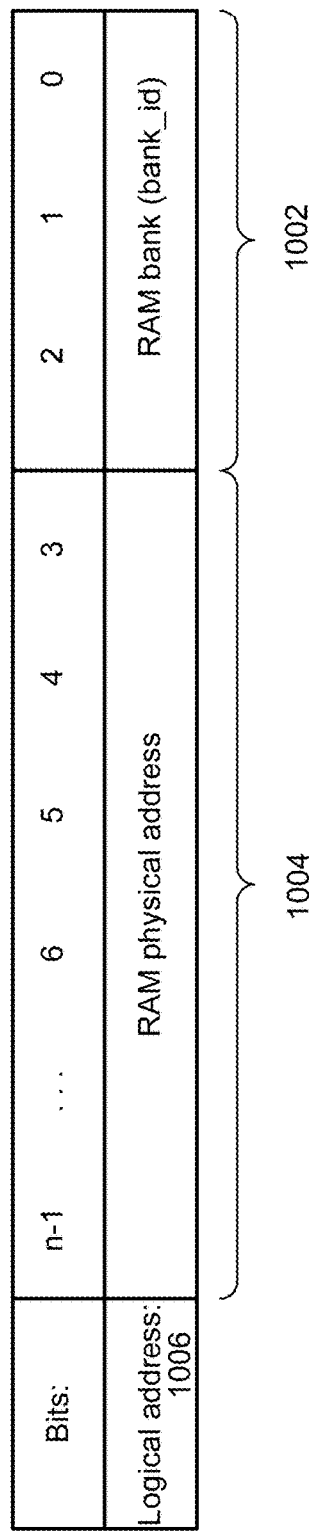
FIG. 10 illustrates, generally at 1000, an implementation that converts a logical address into a specific RAM bank and RAM physical address.

FIG. 10 illustrates, generally at 1000, an implementation that converts the logical address 1006 into a specific RAM bank 1002 and RAM physical address 1004. In this case, the lower 3 bits 1002 of the logical address 1006 indicate the RAM bank (bank_id) and the remaining bits indicate the RAM address (RAM physical address) 1004.

A logical address is the address specified by a program—that is the addresses set up in the address register that is then incremented by the stride register. The physical address is the address sent to a RAM bank. Because we have illustrated having 8 banks, the physical address is the logical address with the lower order 3 bits removed.

Figure 11:
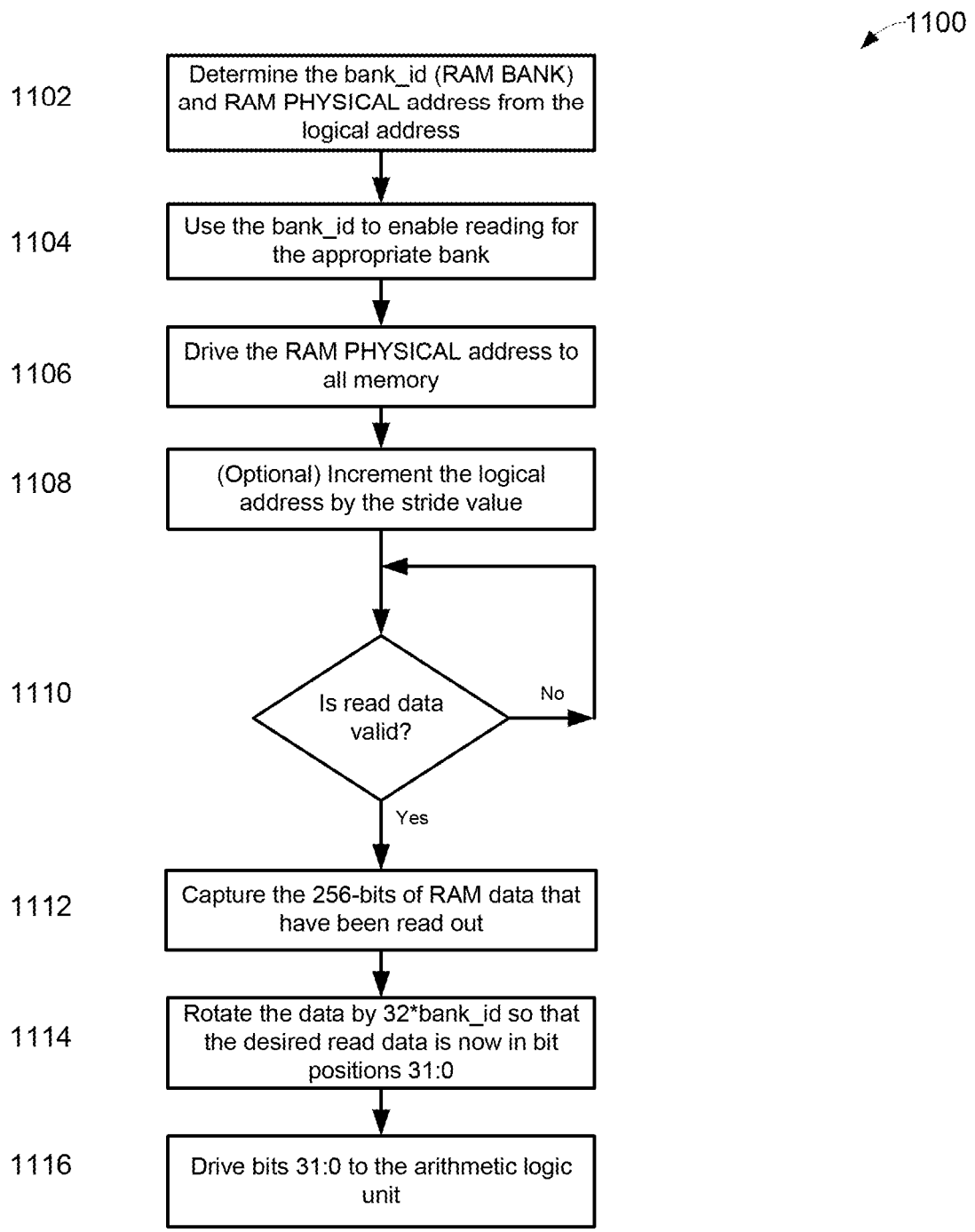
FIG. 11 illustrates, generally at 1100, an implementation that shows a read port operation supporting two operand Reads and one result Write per clock operation.

FIG. 11 illustrates, generally at 1100, an implementation that supports one set of RRWs per clock (which indicates two operand Reads and one result Write per clock). The two operand Reads are performed at the same time. However, for illustration purposes, the read operation performed by a single read port is illustrated in FIG. 11. At 1102 determine the bank_id (RAM bank) and RAM physical address from the logical address. At 1104 use the bank_id to enable reading for the appropriate bank. At 1106 drive the RAM physical address to all of the memory. In particular, the bank_id may represent only certain bits of the logical address, as described above, and as a result all potential read locations should be enabled. At 1108 optionally increment the logical address by the stride value. The incrementing at 1108 prepares for addressing the next RAM address and is generally done, unless the same operand will be utilized in the next operation. At 1110 a check is made to see if the read data is valid. The read data is generally valid one or two clock cycles later, due to the pipeline. If the check for valid data at 1110 is No then repeat the check at 1110. If the read data is valid (Yes) then proceed to 1112. At 1112 capture the 256-bits of RAM data that have been read out. At 1114 rotate the data by 32*bank_id so that the desired read data, i.e. the desired 32 bits of the 256 bits which were read out, is now in bit positions 31:0. At 1116 drive bits 31:0 to the arithmetic logic unit.

Figure 12:
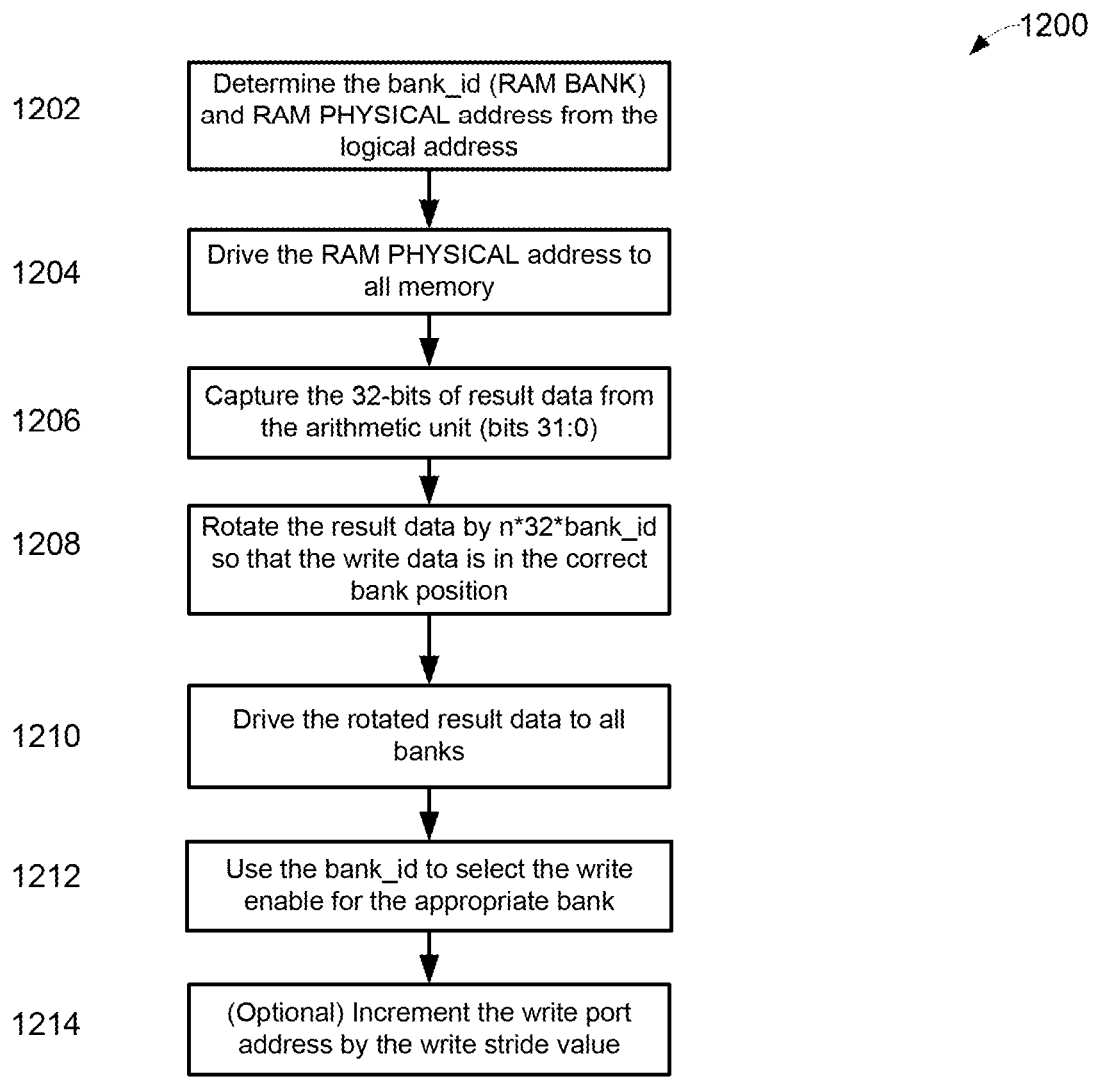
FIG. 12 illustrates, generally at 1200, an implementation that shows a write port operation supporting two operand Reads and one result Write per clock operation.

FIG. 12 illustrates, generally at 1200, an implementation that supports one set of RRWs per clock (which indicates two operand Reads and one result Write per clock), the write operation performed by a write port. At 1202 determine the bank_id and RAM address from the logical address. At 1204 drive the RAM physical address to all memory. At 1206 capture the 32-bits of result data from the arithmetic logic unit (bits 31:0). At 1208 rotate the result data by n*32*bank_id so that the write data is in the correct bank position. Denoted by n is the number of vector ALUs in operation, that is n=1, 2, 4, or 8. At 1210 drive the rotated result to all banks. At 1212 use the bank_id to select the write enable for the appropriate bank. At 1214 optionally increment the write port address by the write stride value. The incrementing at 1214 prepares the next write port RAM address and is generally done, unless we will overwrite the previous value.

The rotation at 1208 for n< >1, is for the situation (more details below) where there are multiple ALUs. The bank_id is determined from the first logical address to be written. That will mean the write data from the 2nd ALU will be rotated to the location for the subsequent bank_id.

While the above example illustrates a single RRW mode of operation, the techniques disclosed are not limited to a single RRW mode of operation and other implementations support a mode of operation that allows multiple sets of RRWs to occur simultaneously. 8 banks can support up to 8 arithmetic logic units, thus improving the performance of a vector operation up to 8-fold. As shown in FIG. 1 at vector data 120 implementations can support 1, 2, 4, or 8 vector ALUs. That is n can be 1, 2, 4, or 8.

The implementation is not so limited and any number of ALUs can be used.

Considering an implementation case of 8 vector ALUs, each read and write port is required to support 8 simultaneous reads or writes. Thus for a RRW operation of 8 vector ALUs 16 reads and 8 simultaneous writes are required. This is achievable when the stride registers have a value of 1 since this provides that mutually exclusive combinations of banks will be accessed for performing all the reads or writes from that port.

Recall a logical address is the address specified by a program—that is the addresses set up in the address register that is then incremented by the stride register. The physical address is the address sent to a RAM bank. Because we have illustrated using 8 banks, the physical address is the logical address with the lower order 3 bits removed.

If the stride is 1 and the logical address is, for example 100, the sequence of logical addresses are 100,101, 102, . . . , etc. That is, the logical address starting with 100 is incremented by the stride of 1 added to the logical address each time we address the next memory address. If we have 8 ALUs then we will need to read operands from all 8 banks at the same time.

However, if the logical address is 100 (equivalent to binary 01100100) and we drop the lower 3 bits we get a physical address of 12 (binary 01100). Now for logical addresses 101 (binary 01100101), 102 (binary 1100110), and 103 (binary 01100111) when we drop the lower 3 bits we have physical address 12. Note however that when we have a logical address of 104 (binary 01101000) we have a physical address of 13 (binary 1101).

That is, notice that if the physical address for logical addresses 100-103 is 12 (address>>3), for logical addresses 104-108 the physical address is 13. So some banks will be read with physical address 12 and others with physical address 13.

The starting bank (the starting address is 100 in this example, has a bank_id of 4 ("address & 7", which is the lower 3 bits of the address, that is, binary 100.) The subsequent banks are 5, 6, 7 for addresses 101, 102, 103. However, for address 104-107 (which are simultaneously read with 100-103), the bank_id is 0,1,2,3—lower than the bank_id of the starting address. It is these banks, the ones with a lower bank_id relative to the starting bank_id, that require an incremented physical address.

It is the responsibility of the port to provide either the physical address or incremented physical address to each of the banks.

A similar circumstance occurs for the write port if more than 1 write per cycle occurs.

A stride other than 1 can become a problem for multiple ALUs. For example, say the stride is 8. Since the lower order 3 bits of 8 are 000, when we add the stride to the address it does not change the lower order 3 bits. That means every address will access the same bank. If we have 8 ALUs, then one bank will be required to perform all 8 reads in the same cycle. And both operands may suffer the same problem, requiring each of the 8 banks to have 16 read ports. However, this problem will not occur if the stride is 1 and the number of ALUs does not exceed the number of banks.

In one implementation, the stride of 1 is not necessarily a practical limitation. For example, a matrix multiply requires the dot-product to be generated for rows of one matrix with the columns of the second matrix. If rows have a stride of 1 then columns do not. However, if the second matrix is transposed, then what used to be columns are now rows and therefore both matrices can now have a stride of 1.

For example, in machine learning algorithms, often the second matrix is a matrix of predetermined constants used as biases or weights. Since it's predetermined, it can be loaded into the memory subsystem in an already transposed form, thereby requiring no overhead for the VPU (Vector Processing Unit) program to perform a transpose.

For example, if a vector addition has the stride registers for all read and write ports set to 1 then logical addresses addr+0, addr+1, addr+2, . . . , addr+7 will refer to different RAM banks and may therefore be simultaneously accessed. Therefore, the read and write ports will be able to support 8 operations per clock. As long as all the read and write ports required by the instruction can also support the same rate (e.g. have a stride value of 1, which means a mutually exclusive combinations of banks will be simultaneously accessed for performing all the reads or writes from that port), then the entire instruction can execute at the accelerated rate.

The accelerated rate or acceleration factor (e.g. 1, 2, 4, or 8) refers to the number of vector ALUs that are operating at the same time. For example, an accelerated rate of 1 indicates 1 vector ALU in operation, whereas an accelerated rate of 8 indicates 8 vector ALUs are in operation.

The accelerated rate modifies the increment of the address register for each port. Instead of incrementing the address register by the stride register, it is incremented by the acceleration factor multiplied by the stride register, 8*stride register in this case for an accelerated rate of 8. The acceleration factor is dependent on the number of ALUs being used for a particular vector or arithmetic operation. If this is set to any one of 1, 2, 4, or 8 for a particular implementation, then the address incrementing function is address register+(stride_register<<{0,1,2, or 3}). A shift of 0 is required for an operation that cannot be accelerated, such as when not all stride registers are equal to 1. Therefore, a particular implementation will increment the address by stride<<S, where S is 1, 2, or 3, depending on whether there are 2, 4, or 8 ALUs available.

Furthermore, this is the same data rotation algorithm for more than 1 ALU. By rotating the data of the starting address into bit 31:0 means only 31:0 goes to ALU 0. But that same rotation means 63:32 always goes to ALU 1, 95:63 to ALU 2, etc.

Then for the data coming from the ALUs for a write operation, they need to be similarly rotated. ALUs 7 through 0 will constitute 8*32 bits of data in the form 255:0 bits. This is rotated so the 31:0 bits are rotated to the bank indicated by the starting address. This way, ALU 0 will receive the read data from the read-operand starting addresses and will write the result to the starting write address. ALU's 1-7 will be rotated correctly, symmetric with the read process.

The reason all stride registers involved in the operation should be 1 is to avoid bank conflict, where a bank of a particular port is required to perform two different reads or two different writes simultaneously. This is particularly obvious if the stride register is 8 since that would mean all the 8 different reads would need to be performed by the same bank! That is a stride of 8 means all addresses have the same bank_id, in an example where the bank_id is the lower order 3 bits, it being understood that different numbers of banks may be utilized without exceeding the scope.

The accelerated mode of operation method also needs to take into account that the final cycle of writes does not necessarily write to all banks. For example, a vector add with length 83 will need to write all 8 banks for 10 cycles and then only 3 banks on the 11th cycle. It does no harm in reading from a bank whose data is not needed but it is a problem to write to a bank with data that is not part of the specified operation.

The chart below illustrates operand reads r0-r9 will read 8 sets of operands each. The vector multiply will produce 8 multiplicative results per cycle for m0-m9, for a total of 80 results. w0-w9 will write these 80 results at the rate of 8 per clock. But the vector length is 83 and it is r10, m10, and w10 that are responsible for reading and writing the final 3 results. It is critically important that w10 only writes 3 results, not the full capacity of 8 results, otherwise it will modify memory beyond the length of the result vector.

Whether r10 reads 3 or 8 operands or m10 generates 3 or 8 results is unimportant in this example, since w10 will only write the first 3 results. But if the vector operation were a dot-product, the ALU must treat the excess 5 operands as having a zero value so as not to incorrectly affect the result. Either r10 needs to zero out the excess 5 operands or the ALU needs to ignore them for a dot-product operation.

| cycle | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| rd port 0 | r0 | r1 | r2 | r3 | r4 | r5 | r6 | r7 | r8 | r9 | r10 | | | |
| rd port 1 | r0 | r1 | r2 | r3 | r4 | r5 | r6 | r7 | r8 | r9 | r10 | | | |
| ALU mul | | | m0 | m1 | m2 | m3 | m4 | m5 | m6 | m7 | m8 | m9 | m10 | |
| wr port | | | | w0 | w1 | w2 | w3 | w4 | w5 | w6 | w7 | w8 | w9 | w10 |

Figure 13:
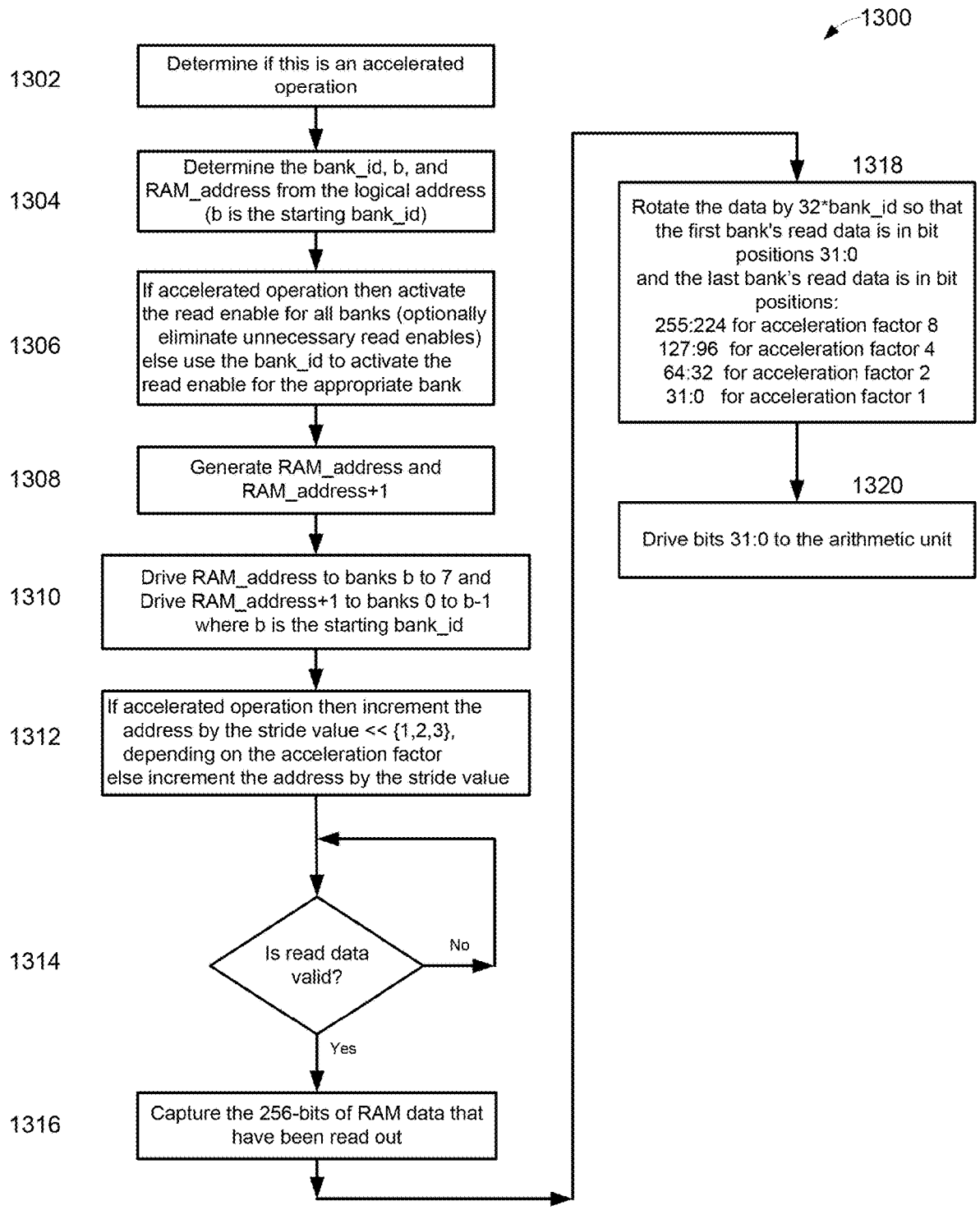
FIG. 13 illustrates, generally at 1300, an implementation of an accelerated mode of operation showing a read port operation.

FIG. 13 illustrates, generally at 1300, an implementation of the accelerated mode of operation showing the read port operation. At 1302 determine if this is an accelerated operation. At 1304 determine the bank_id, b, and RAM_address from the logical address (where b is the starting bank_id). At 1306 when accelerated operation is indicated then activate the read enable for all banks (optionally eliminate unnecessary read enables), else use the bank_id to activate the read enable for the appropriate bank. At 1308 generate RAM_address and RAM_address+1. At 1310 drive RAM_address to banks b to 7 and drive RAM_address+1 to banks 0 to b-1, where b is the starting bank_id. At 1312 if accelerated operation then increment the address by the stride value<<{1,2,3}, depending on the acceleration factor, else increment the address by the stride value. At 1314 a check is made to see if the read data is valid. The read data is generally valid one or two clock cycles later. If the check for valid data at 1314 is No then repeat the check at 1314. If the read data is valid (Yes) then proceed to 1316. At 1316 capture the 256-bits of RAM data that have been read out. At 1318 rotate the data by 32*bank_id so that the first bank's read data is in bit positions 31:0 and the last bank's read data is in bit positions 255:224 for acceleration factor 8, 127:96 for acceleration factor 4, 64:32 for acceleration factor 2, and 31:0 for acceleration factor 1. At 1320 drive bits 31:0 to the arithmetic logic unit.

Figure 14:
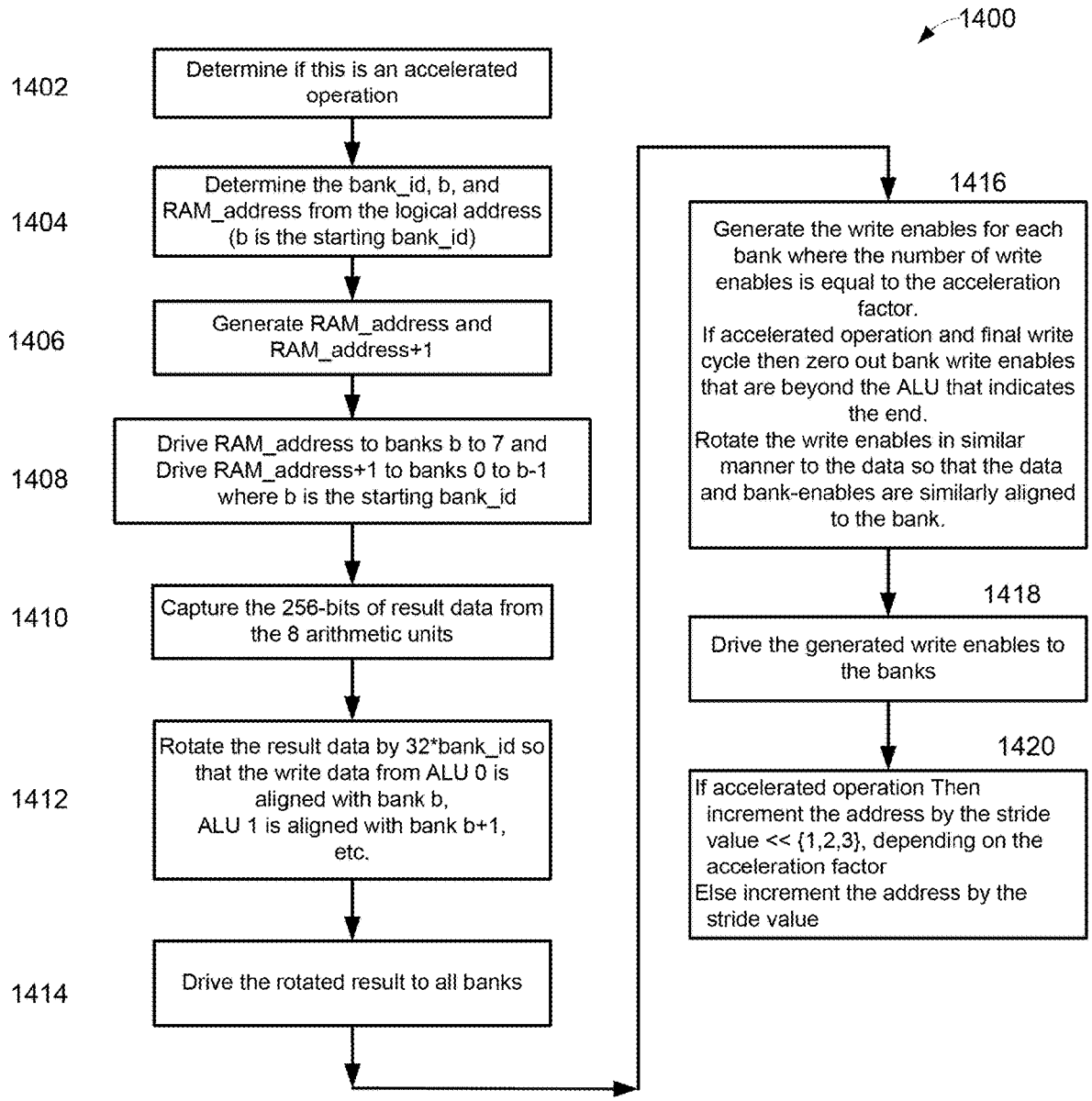
FIG. 14 illustrates, generally at 1400, an implementation of an accelerated mode of operation showing a write port operation.

FIG. 14 illustrates, generally at 1400, an implementation of the accelerated mode of operation showing the write port operation. At 1402 determine if this is an accelerated operation. At 1404 determine the bank_id, b, and RAM_address from the logical address (b is the starting bank_id). At 1406 generate RAM_address and RAM_address+1. At 1408 Drive RAM_address to banks b to 7 and Drive RAM_address+1 to banks 0 to b-1, where b is the starting bank_id. At 1410 capture the 256-bits of result data from the 8 arithmetic logic units. At 1412 rotate the result data by 32*bank_id so that the write data from ALU 0 is aligned with bank b, ALU 1 is aligned with bank b+1, and so forth. At 1414 drive the rotated result to all banks. At 1416 generate the write enables for each bank where the number of write enables is equal to the acceleration factor. When accelerated operation and final write cycle then zero out (disable) bank write enables that are beyond the ALU that indicates the end. Rotate the write enables in similar manner to the data so that the data and bank-enables are similarly aligned to the bank. At 1418 drive the generated write enables to the banks. At 1420 when accelerated operation then increment the address by the stride value<<{1,2,3}, depending on the acceleration factor, else increment the address by the stride value.

We zero out (disable) bank write enables at 1416 that are beyond the ALU that indicates the end. For example, if the number of writes to be performed are 35 and there are 8 ALUs, then the first 4 cycles will write all 8 banks but the last cycle will only write the 3 results from ALU 0, 1, and 2.

Note that while the techniques described allow for accelerated operation, there are times that you may not want to accelerate all operations. For example, if one of the operations is to calculate the TANH values from a sequence of operands, this may represent a lot of circuit logic and may only be implemented in ALU #0. That is, for example, the 8 ALUs (e.g. Vector ALU #0 to Vector ALU #7 in FIG. 15) do not have to be identical. So if ALU #0 is improved for, or just used for, calculating TANH values from a sequence of operands this cannot be accelerated. However, common operations such as, but not limited to, ADD, MUL, may be implemented in all ALUs and can be accelerated.

Figure 15:
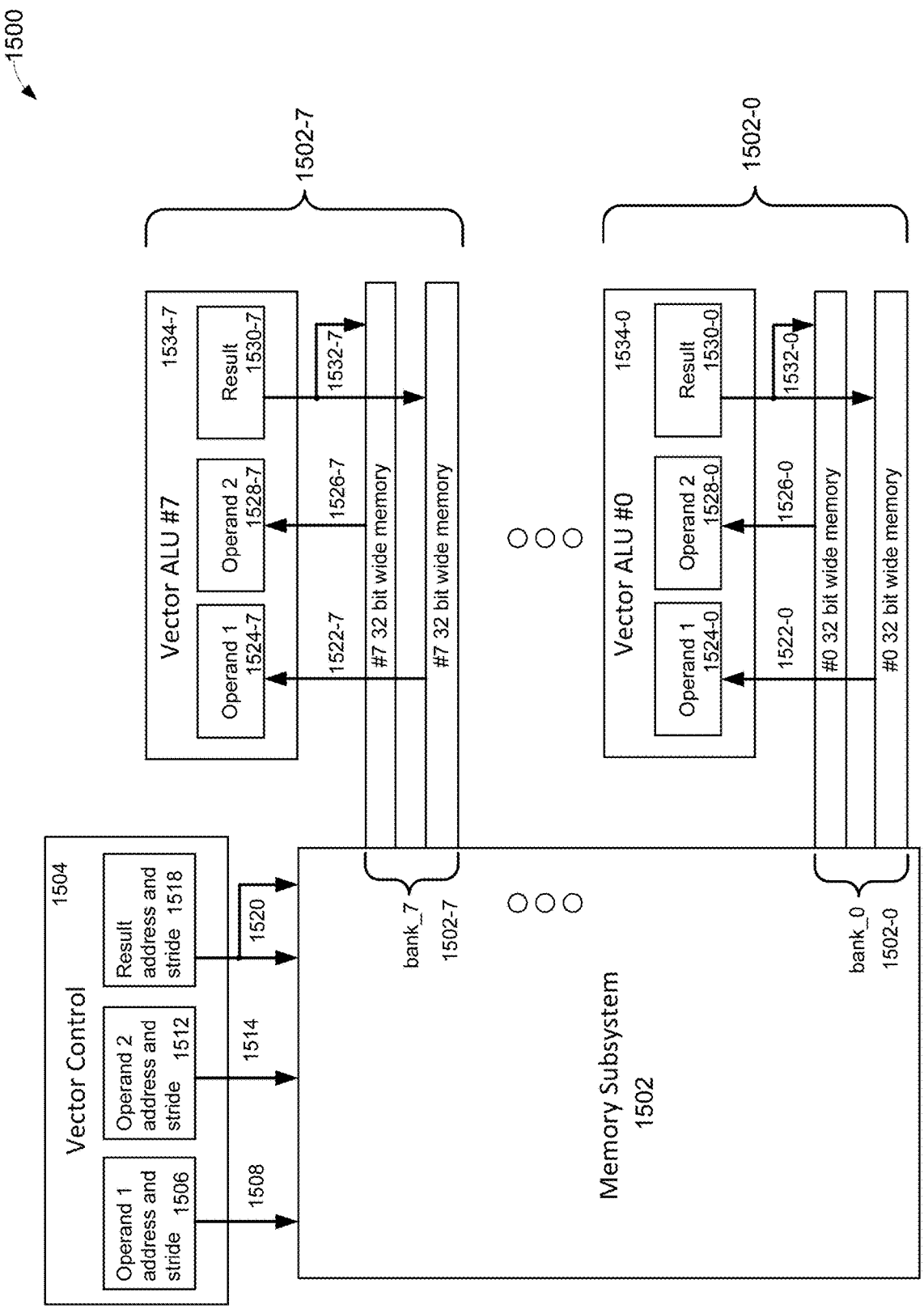
FIG. 15 illustrates, generally at 1500, an implementation showing 8 vector arithmetic logic units (vector ALUs).

FIG. 15 illustrates, generally at 1500, an implementation showing 8 vector arithmetic logic units (vector ALUs) and their supporting vector control and vector data. For simplicity of illustration, while the techniques are not so limited, in FIG. 15 we illustrate 8 vector ALU units that can be understood to all be operating in lockstep. That is, they are all operating simultaneously and accessing memory at the same time. That is, they are all reading their own 2 operands at the same time and they are all writing their own results at the same time. Accordingly, for simplicity of illustration, while the techniques are not so limited, only a single vector control is needed to, for example, addressing a 256 bit wide memory for 2 reads and 1 write per cycle. Such a memory structure was illustrated in FIG. 8. Also, for simplicity of illustration, while the techniques are not so limited, FIG. 15 illustrates dedicated memory banks to each vector ALU. Shown at 1502 is a Memory Subsystem having 8 output banks 1502-0 bank_0 through 1502-7 bank_7. Vector Control 1504 includes at 1506 Operand 1 address and stride (considered a vector read port) which interfaces via 1508 with 1502 Memory Subsystem.

Also shown at 1504 Vector Control is at 1512 Operand 2 address and stride (considered a vector read port) which interfaces via 1514 with 1502 Memory Subsystem.

Also shown at 1504 Vector Control is at 1518 Result address and stride (considered a vector write port) which interfaces via 1520 with 1502 Memory Subsystem. FIG. 15 at 1520 shows two arrows going into Memory Subsystem 1502 although only one is needed. It is for illustration purposes only so the reader can relate to, for example, the memory structure illustrated in FIG. 8 at 830 that supports 2 read ports and 1 write port.

At 1534-0 is shown Vector ALU #0 which at 1524-0 Operand 1 is received via 1522-0 from bank_0 1502-0; at 1528-0 Operand 2 is received via 1526-0 from bank_0 1502-0; and at 1530-0 Result is sent via 1532-0 to bank_0 1502-0.

Not shown 1534-1, 1534-2, 1534-3, 1534-4, 1534-5, and 1534-6 have a similar structure as is shown at 1534-0.

At 1534-7 is shown Vector ALU #7 which at 1524-7 Operand 1 is received via 1522-7 from bank_7 1502-7; at 1528-7 Operand 2 is received via 1526-7 from bank_7 1502-7; and at 1530-7 Result is sent via 1532-7 to bank_7 1502-7.

As shown in FIG. 15 if the Vector ALU, for example, Vector ALU #0 is a 32 bit vector ALU then the read and write ports are 32 bits wide.

Thus for a vector processor unit having 8 vector ALUs the memory is 8 vector ALUs*32 bits per vector ALU=256 bits wide.

As can be seen in FIG. 15 there are a plurality of vector ports 1506, and 1512 and 1518. Each can each support a read per clock cycle through interface 1508 and 1514 from Memory Subsystem 1502 and a write through interface 1520, thus 2 reads and 1 write per clock cycle while performing a gather and scatter operation. That is the vector ports 1506, and 1512 supply their respective memory with address and stride information for gathering the respective vectors, and 1518 supplies the memory with address and stride information for scattering the respective vectors operation results.

As can be seen in FIG. 15 when all 8 respective vector control units (with their vector ports) and memory and vector ALUs are operating then the plurality of vector ports can support sixteen reads and eight writes per clock cycle for the memory subsystem 1502, which is in one example a random access memory.

While various implementations of the read and write ports have been described, for illustrative purposes, the structure of FIG. 8 was used in FIG. 15 to simplify the understanding of the Read and Write Ports.

As noted in the FIG. 15 description, one of the simplifications was to associate a bank of the memory subsystem with a particular vector ALU. The technique is not so limited and as was described supra at, for example, FIG. 11, FIG. 12, FIG. 13, and FIG. 14 the memory addressing and rotations make the read and write (gather and scatter) operations very flexible.

A programming consideration when an implementation has the accelerated mode is to prefer vectors to have a stride of 1 since this enables the accelerated mode. For example, a matrix multiplication requires many dot products of row vectors with column vectors. As such, these cannot be accelerated. But if the second-operand matrix is transposed first, then the dot product is performed with pairs of row vectors, both of which have a stride of 1. The acceleration gained can far outweigh the overhead of the transposition since the cost of transposition is Big O order N (f(x)=O(N)) but the performance gain is Big O order N^2 (f(x)=O(N^2)).

Many times, the matrix transpositions can be eliminated by changing the form of the data. For example, in neural networks, many times a matrix may be a set of constants and are therefore predetermined. It's relatively easy to transpose the data when it's predetermined so it's already in transposed form in memory.

While the illustrations above have concentrated on row and column addressing the implementation is not so limited. For example, diagonal addressing of a matrix is achieved by using the stride as needed. For example, looking at FIG. 3, if the diagonal starting at row 1 col 1 to row 4 col 4 is desired (i.e. the vector 1, 9, 6, 4) then the addresses are 0, 5, 10, 15. Setting the stride to 5 will achieve this addressing sequence. Again, looking at FIG. 3, for example, if the diagonal vector 4, 1, 7, 3 (row 1 col 4, to col 1 row 4) is desired then the addresses respectively are 3, 6, 9, 12. Again, setting the stride to 3 will achieve this addressing sequence.

Figure 16:
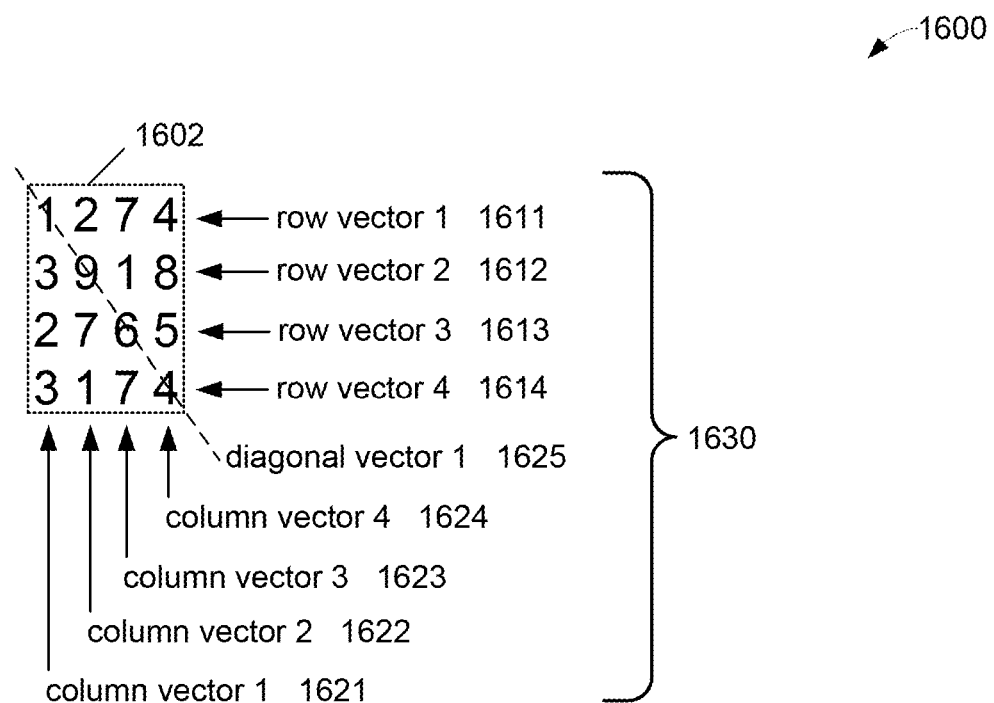
FIG. 16 illustrates, generally at 1600, an implementation showing how various address and stride values result in different values being accessible from a memory.

FIG. 16 illustrates, generally at 1600, an implementation showing how various address and stride values result in different values being accessible from a memory holding contents, for example, without limitation a matrix. At 1630 is a 4×4 matrix with notations. At 1602 is a 4×4 matrix having 4 rows and 4 columns. At 1611 is row vector 1 having 4 elements having the respective values of 1, 2, 7, and 4. At 1612 is row vector 2 having 4 elements having the respective values of 3, 9, 1, and 8. At 1613 is row vector 3 having 4 elements having the respective values of 2, 7, 6, and 5. At 1614 is row vector 4 having 4 elements having the respective values of 3, 1, 7, and 4. At 1621 is column vector 1 having 4 elements having the respective values of 1, 3, 2, and 3. At 1622 is column vector 2 having 4 elements having the respective values of 2, 9, 7, and 1. At 1623 is column vector 3 having 4 elements having the respective values of 7, 1, 6, and 7. At 1624 is column vector 4 having 4 elements having the respective values of 4, 8, 5, and 4. At 1625 is diagonal vector 1 having 4 elements having the respective values of 1, 9, 6, and 4.

At 1640 is shown the result of accessing matrix 1602 using a staring address of 0 and a stride of 1 for 4 accesses. As can be seen this has accessed 1611 row vector 1.

At 1642 is shown the result of accessing matrix 1602 using a staring address of 0 and a stride of 4 for 4 accesses. As can be seen this has accessed 1621 column vector 1.

At 1644 is shown the result of accessing matrix 1602 using a staring address of 0 and a stride of 5 for 4 accesses. As can be seen this has accessed the diagonal vector from upper left 1 to lower right 4 denoted as diagonal vector 1 1625.

Thus a Method and Apparatus for Gather/Scatter operations in a Vector Processor have been described.

For purposes of discussing and understanding the examples, it is to be understood that various terms are used by those knowledgeable in the art to describe techniques and approaches. Furthermore, in the description, for purposes of explanation, numerous specific details are set forth in order to provide a thorough understanding of the examples. It will be evident, however, to one of ordinary skill in the art that the examples may be practiced without these specific details. In some instances, well-known structures and devices are shown in block diagram form, rather than in detail, in order to avoid obscuring the examples. These examples are described in sufficient detail to enable those of ordinary skill in the art to practice the examples, and it is to be understood that other examples may be utilized and that logical, mechanical, and other changes may be made without departing from the scope of the examples.

As used in this description notation such as, for example, "stride value<<{1,2,3}" is understood by one of skill in the art to indicate that the stride value is to be shifted by 1, 2, or 3 bit positions which correspond to the (stride value)*2, (stride value)*4, and (stride value)*8, respectively.

As used in this description reference to bits is understood to refer to individual data. Grouping multiple bits can be represented by using an Endianess. The Endianess can be either Big-endian or Little-endian. Big endian numbers the bits left to right. For example, the bits of a byte are numbered 0, 1, 2, 3, 4, 5, 6, 7. Little endian numbers the bits right to left. For example, the bits of a byte are numbered 7, 6, 5, 4, 3, 2, 1, 0. For example, bits 31:0 is understood to represent the bits thusly:

31 30 29 28 27 26 25 24 23 22 21 20 19 18 17 16 15 14 13 12 11 10 9 8 7 6 5 4 3 2 1 0

As used in this description, "one example" or "an example" or similar phrases means that the feature(s) being described are included in at least one example. References to "one example" in this description do not necessarily refer to the same example; however, neither are such examples mutually exclusive. Nor does "one example" imply that there is but a single example. For example, a feature, structure, act, etc. described in "one example" may also be included in other examples. Thus, the invention may include a variety of combinations and/or integrations of the examples described herein.

As used in this description, "substantially" or "substantially equal" or similar phrases are used to indicate that the items are very close or similar. Since two physical entities can never be exactly equal, a phrase such as "substantially equal" is used to indicate that they are for all practical purposes equal.

It is to be understood that in any one or more examples where alternative approaches or techniques are discussed that any and all such combinations as may be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given to any combination.

Thus a Method and Apparatus for Gather/Scatter operations in a Vector Processor have been described.

What is claimed is:

1. A vector processor gather/scatter apparatus comprising:
a plurality of vector ports;
a random access memory;
the plurality of vector ports in communication with the random access memory; and
wherein one or more of the plurality of vector ports uses a respective address registers and a respective stride registers to generate an autoincrementing address for the random access memory; and
wherein when the autoincrementing address equals, or is greater than, a length value in a respective port's length register for the one or more of the plurality of vector ports, then the respective address register is reset to an original value.

2. The vector processor gather/scatter apparatus of claim 1 wherein the plurality of vector ports can support up to two reads and a write per clock cycle for the random access memory while performing a gather and scatter operation.

3. The vector processor gather/scatter apparatus of claim 1 wherein the plurality of vector ports can support sixteen reads and eight writes per clock cycle for the random access memory.

4. The vector processor gather/scatter apparatus of claim 1 wherein the one or more address registers and the one or more stride registers allow a matrix stored in the random access memory to be accessed along a sequence, the sequence consisting of one or more of the following, along a row of the matrix, along a column of the matrix, and along a diagonal of the matrix.

* * * * *

UNITED STATES PATENT AND TRADEMARK OFFICE
CERTIFICATE OF CORRECTION

| | |
|---|---|
| PATENT NO. | : 12,175,116 B2 |
| APPLICATION NO. | : 17/669995 |
| DATED | : December 24, 2024 |
| INVENTOR(S) | : Christopher I. W. Norrie |

It is certified that error appears in the above-identified patent and that said Letters Patent is hereby corrected as shown below:

In the Claims

Claim 1, Column 18, Line 8, replace "registers" with --register--; and
Claim 1, Column 18, Line 9, replace "registers" with --register--.

Signed and Sealed this
Sixth Day of May, 2025

Coke Morgan Stewart
*Acting Director of the United States Patent and Trademark Office*